(12) United States Patent  
Nuzzi et al.

(10) Patent No.: US 11,810,119 B2
(45) Date of Patent: *Nov. 7, 2023

(54) FINANCIAL STRENGTH INDICATION

(71) Applicant: PAYPAL, INC., San Jose, CA (US)

(72) Inventors: Frank Anthony Nuzzi, Pflugerville, TX (US); James Brett Sowder, Austin, TX (US); Sandra Lynn Godsey, San Jose, CA (US); Vincent Ng, Beaverton, OR (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/341,180

(22) Filed: Jun. 7, 2021

(65) Prior Publication Data

US 2021/0312463 A1   Oct. 7, 2021

Related U.S. Application Data

(63) Continuation of application No. 16/029,521, filed on Jul. 6, 2018, now Pat. No. 11,030,626, which is a (Continued)

(51) Int. Cl.
  *G06Q 20/40* (2012.01)
  *G06Q 20/32* (2012.01)
(52) U.S. Cl.
  CPC ..... *G06Q 20/4037* (2013.01); *G06Q 20/3221* (2013.01)
(58) Field of Classification Search
  CPC .................................................. G06Q 20/4037
  See application file for complete search history.

(56) References Cited

U.S. PATENT DOCUMENTS 8,535,138 B2 * 9/2013 Amaitis ................. G06Q 40/04
                                                                              463/16
2006/0151598 A1   7/2006 Chen et al.
(Continued)

FOREIGN PATENT DOCUMENTS

| CN | 1285068 A | * | 2/2001 | ......... G06Q 30/0601 |
| JP | 2011048484 A | | 3/2011 | |
| WO | WO-2005073835 A2 | * | 8/2005 | ............. G06Q 40/00 |

OTHER PUBLICATIONS

Shin et al. Understanding and prediction of mobile application usage for smart phones. UbiComp '12: Proceedings of the 2012 ACM Conference on Ubiquitous Computing. Sep. 2012, pp. 173-182. (Year: 2012).*

(Continued)

*Primary Examiner* — Virpi H Kanervo
(74) *Attorney, Agent, or Firm* — Haynes and Boone, LLP

(57) ABSTRACT

A method for providing an indication of financial strength includes receiving a financial indicator and a predetermined spending budget status from a user. The predetermined spending budget status is associated with a spending budget for the user that has at least one payment account. The financial indicator is then associated with the predetermined spending budget status. A payment request that includes one of the at least one payment accounts is then received from a merchant. A current spending budget status is then determined using the spending budget and the at least one payment account. The financial indicator is then sent to the merchant for provision to the user in response to the current spending budget status being included in the predetermined spending budget status.

20 Claims, 15 Drawing Sheets

Related U.S. Application Data continuation of application No. 13/618,994, filed on Sep. 14, 2012, now abandoned.

(56) References Cited

U.S. PATENT DOCUMENTS

| | | |
|---|---|---|
| 2010/0250430 A1 | 9/2010 | Ariff et al. |
| 2012/0024947 A1 | 2/2012 | Naelon |
| 2012/0233072 A1 | 9/2012 | Calman et al. |
| 2013/0097036 A1 | 4/2013 | Fisher |
| 2015/0250430 A1* | 9/2015 | Kolanko ............ A61B 5/7264 |
| | | 600/408 |

OTHER PUBLICATIONS

Li Xia, "Design and teaching research of dynamic interaction VI," 2010 IEEE 11th International Conference on Computer-Aided Industrial Design & Conceptual Design 1, Yiwu, China, 2010, pp. 195-198. (Year: 2010).*

Bons R., et al., "Banking In The Internet And Mobile Era," Electron Markets, 2012, vol. 22: 197-202, 6 pages.

* cited by examiner

FINANCIAL STRENGTH INDICATION

CROSS REFERENCED TO RELATED APPLICATIONS

This continuation patent application claims priority to and the benefit of U.S. patent application Ser. No. 16/029,521, filed Jul. 6, 2018, which is a continuation of U.S. patent application Ser. No. 13/618,994, filed Sep. 14, 2012, the contents of which are incorporated by reference in their entirety.

BACKGROUND

Field of the Invention

The present invention generally relates to online and/or mobile payment systems and more particularly to indication of financial strength that may be used with, for example, online and mobile payment systems.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

As the money used in transactions moves from physical currency to the electronic currency used, for example, in online and/or mobile payment systems, the tangible aspect of that money is lost. Conventionally, a user may have limited their spending by providing themselves a fixed amount of physical currency for a time period (e.g., each day, each week, etc.), and when that user ran out of physical currency they were aware of their spending limitations because they no longer had the physical currency in their possession to spend. To contrast, electronic currency payment instruments (e.g., credit cards, debit cards, online or mobile payment devices, etc.) may provide a user with access to all of their money, and sometimes allow a user to borrow more than the amount of money they have in order to make payments. Thus, the use of electronic currency limits the ability of users to easily track their finances and spending habits.

Thus, there is a need for a system that allows a user to quickly and easily determine their financial strength.

SUMMARY

According to one embodiment, a method for providing an indication of financial strength includes associating one or more financial indicators with one or more accounts of a user in a database. In some examples, the one or more accounts may be tracked and their associated financial indicators may then be provided or updated on a user device. In another example, the one or more financial indicators may be associated with a spending budget for the one or more accounts in the database by associating different financial indicators with respective different predetermined spending budget statuses, and when a payment request using one of the accounts is received, a current spending budget status may be determined. The predetermined spending budget status that includes the current spending budget status may then be used to retrieve its associated financial indicator, and that financial indicator may be provided to the user so that the user is aware of their current financial strength and how the payment request may affect it.

In an embodiment, financial indicators may include visual financial indicators that may be provided on icons displayed on a user device and that may indicate current financial strength with regard to the one or more accounts and/or spending budgets, and may be periodically or continuously updated to indicate current financial strength with regard to the one or more accounts and/or spending budgets. In other embodiments, financial indicators may include visual financial indicators such as graphics, images, or video, and/or audio financial indicators such as audio files, and those financial indicators may be provided at the time of a payment request to indicate the financial strength of the user with regard to one or more payment accounts and/or spending budgets, along with how the payment request might effect that financial strength.

As a result, a user may quickly and easily determine their financial strength as it relates to one or more accounts and/or spending budgets by referencing one or more financial indicators that are provided and/or periodically updated on their user device. Furthermore, when making a purchase, good spending behavior with regard to one or more payment accounts and/or spending budgets may be reinforced with positive visual and/or audio financial indicators, while bad spending behavior with regard to one or more payment accounts and/or spending budgets may be discouraged with negative visual and/or audio financial indicators.

These and other features and advantages of the present disclosure will be more readily apparent from the detailed description of the embodiments set forth below taken in conjunction with the accompanying figures.

Figure 1:
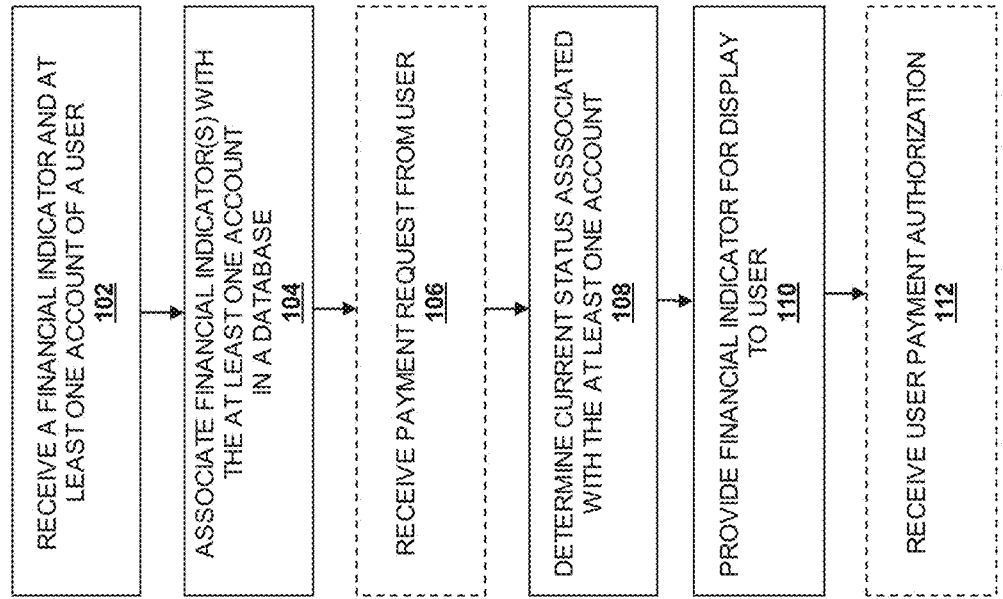
FIG. 1 is a flow chart illustrating an embodiment of a method for providing an indication of financial strength.
Figure 1:
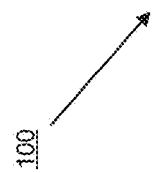

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for providing indications of financial strength to a user so that the user can better monitor their financial situation. A financial indicator may be associated with at least one account or a spending budget, and may be continuously or periodically updated with the current status of the at least one account or spending budget to provide the user with a quickly-referenced indication of their financial strength. Financial indicators may also be associated with predetermined statuses of a spending budget that is associated with one or more accounts, and when a payment request using one of payment accounts is received, a current spending budget status is determined and compared to the predetermined statuses. The financial indicator associated with the predetermined status that includes the current spending budget status may then be sent to a user device or payment terminal from where the payment request was made to provide the user an indication of their financial strength with regard to their spending budget and how the payment request might affect it. The system and methods herein may be used to provide a user with indications of their financial strength at any time, and may be provided to reinforce good spending behavior and discourage bad spending behavior depending on a currently received payment request and the current status of a spending budget.

Figure 2A:
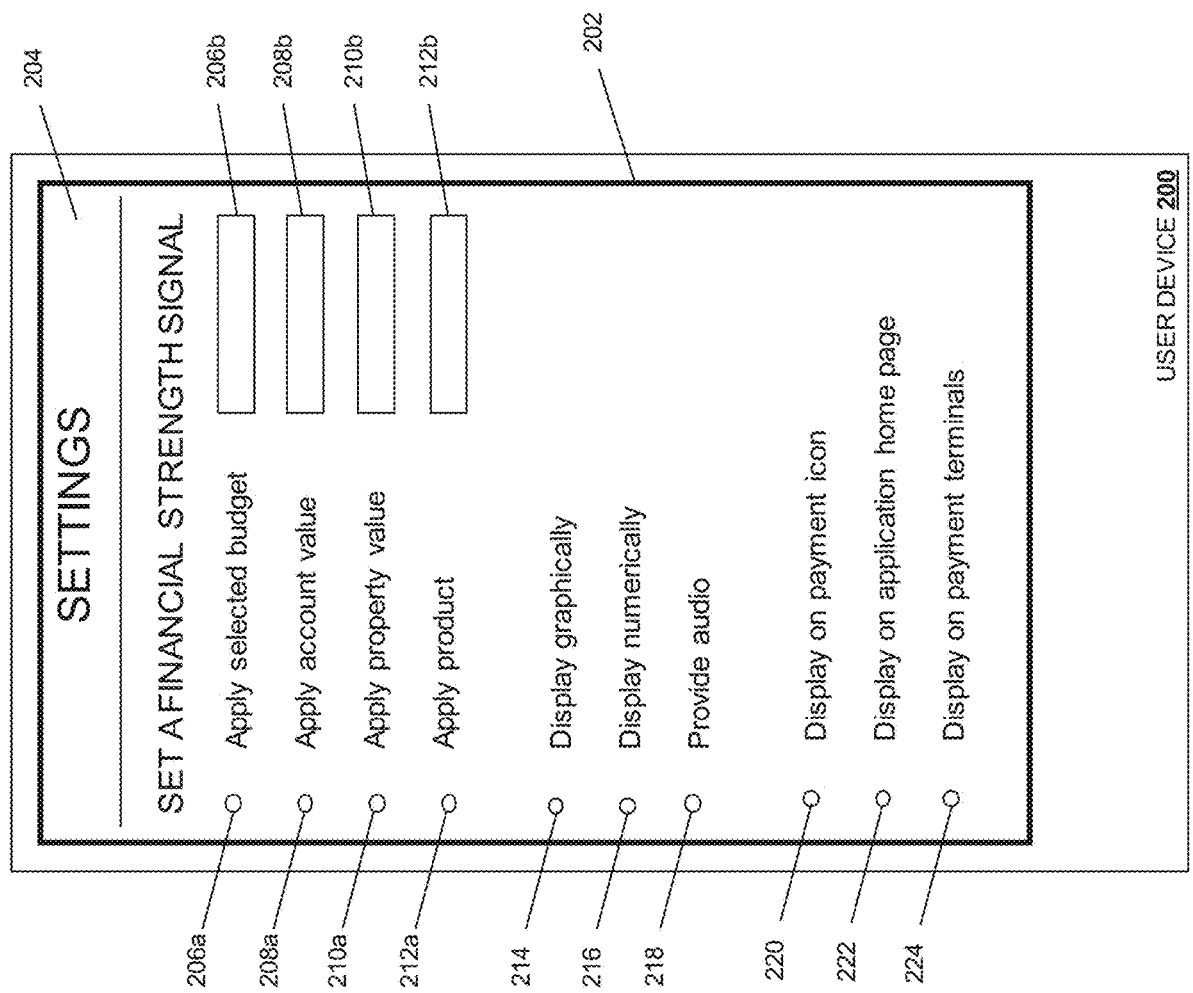
FIG. 2a is a front view illustrating an embodiment of a user device being used to set up a financial indicator.
Figure 2B:
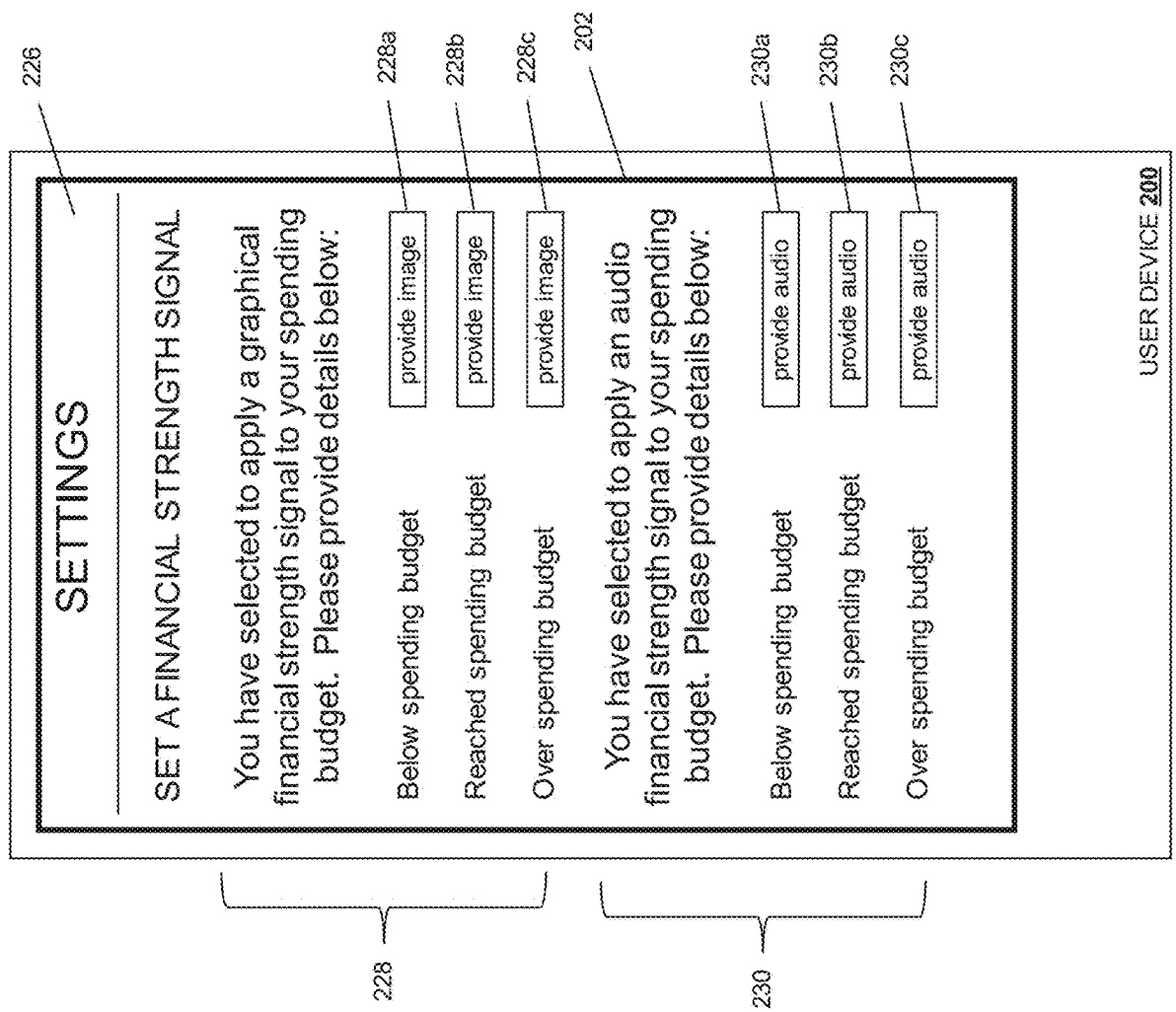
FIG. 2b is a front view illustrating an embodiment of a user device being used to set financial indicator details.

Referring now to FIGS. 1, 2a, and 2b, a method 100 for providing an indication of financial strength is illustrated. In an embodiment of the method 100 described below, one or more account providers provide a user with one or more user payment accounts, and the user may use the user payment accounts to fund payments for purchases made from merchants or other payees. In another embodiment, a payment service provider such as, for example, PayPal, Inc. of San Jose, Calif. assists in the making of payments from the user to the merchants or other payees by transferring funds from the user payment account to a merchant account of the merchant. However, these embodiments are meant to be merely exemplary, and one of skill in the art will recognize that a variety of modifications may be made to the financial strength indication system discussed below without departing from the scope of the present disclosure.

The method 100 begins at blocks 102 where a financial indicator and at least one account of a user are received. In an embodiment, a user having a user device 200 with a display screen 202, illustrated in FIG. 2, may access their user financial account over a network (e.g., the Internet) by connecting to an account provider device of the account provider, may access a payment service account over the network by connecting to a payment service provider device of a payment service provider, may provide the instructions about a financial indicator and at least one financial account to a financial strength indication system provider device of a financial strength indication system provider, or may provide the instructions about a financial indicator and at least one financial account to the user device 200 (e.g., to a database or storage device on the user device 200.) One of skill in the art will recognize that any of an account provider, payment service provider, and/or other third party financial strength indication system provider may assist in providing indications of financial strength of a user as is described below. While the user device 200 is illustrated and described below as a mobile device such as, for example, a mobile phone or computer, one of skill in the art will recognize that the provision of financial indicators and at least one account may be performed on a desktop computer, on other computing systems connected to a network, and/or using a variety of other devices known in the art.

As described in further detail below, financial indicators may be provided in a variety of forms, including but not limited to visual financial indicators such as graphics, images, animated graphics, video, and/or a variety of other visual indicators known in the art. Financial indicators may also be provided as audio financial indicators including audio files, and may be provided in combination the visual financial indicators. Furthermore, as discussed below, a user may provide any media known in the art for use by the financial strength indication system as a visual or audio financial indicator. In an embodiment of block 102 of the method 100, upon connecting to the account provider device, payment service provider device, or other financial strength indication system provider device, the user may be provided with a financial indicator set-up screen 204 (e.g., over the network.) In another embodiment of block 102 of the method 100, the financial indicator set-up screen 204 may be provided to the user by the user device 200 upon accessing a settings function in a financial strength indication application. The financial indicator set-up screen 204 of the illustrated embodiment is provided as an example of how a financial indicator may be set up, but as discussed below, may be modified to customize the properties of financial indicators and associate any number of accounts, spending budgets, or other financial entities of the user with the financial indicator as is desired.

The financial indicator set-up screen 204 includes an apply budget selector 206a along with a budget input 206b that the user may use to select (or create) a spending budget to associate with the financial indicator, an apply account selector 208a along with an account input 208b that the user may use to select one or more accounts to associated with the financial indicator, an apply property selector 210a along with a property input 210b that the user may use to select one or more properties to associate with the financial indicator, and an apply product selector 212a along with product input 212b that the user may use to select one or more products (e.g., that the user is selling) to associate with the financial indicator.

The financial indicator set-up screen 204 also includes a graphical display selector 214 that the user may select to have the financial indicator displayed visually or graphically, a numerical display selector 216 that the user may select to have the financial indicator display numerically, and an audio provision selector 218 that the user may select to have the financial indicator provided as audio, all of which are discussed in further detail below. The financial indicator set-up screen 204 also includes an icon location selector 220 that the user may select to have the financial indicator provided on an icon, a page location selector 222 that the user may select to have the financial indicator provided on an application home page, and a payment terminal location selector 224 that the user may select to have the financial indicator provided on a payment terminal, all of which are discussed in further detail below.

In an embodiment, in response to the user selecting the apply budget selector 206a and selecting (or creating) a spending budget in the budget input 206b, selecting the graphical display selector 214, and selecting the audio provision selector 216, the user may be presented with a financial indicator details screen 226, illustrated in FIG. 2b. For example, the user may select or create a spending budget that sets an amount the user wishes to spend during a time period. For example, the user may only wish to spend a given amount of money ($100, $500, etc.) each day, week, month, or other period of time, and the spending budget may be set to track the users spending with regard to those spending budget details. Furthermore, the user may associate spending budgets with different types of spending such as, for example, spending on groceries, restaurants, bars, etc. While a few examples have been given, a variety of spending budgets will fall within the scope of the present disclosure. Furthermore, while the spending budgets are described herein as directed to real currencies, they may be applied to virtual currencies, such as those used in videos games, as well.

The financial indicator details screen 226 includes a graphical financial indicator details section 228 that allows the user to select or provide images for financial indicators for a plurality of predetermined spending budget statuses, including an image input 228a for a financial indicator that indicates when the user is below their spending budget, an image input 228b for a financial indicator that indicates when the user has reached their spending budget, and an image input 228c for a financial indicator that indicates when the user is over their spending budget. The financial indicator details screen 226 also includes an audio financial indicator details section 230 that allows the user to select or provide audio for a plurality of predetermined spending budget statuses, including in an audio input 230a for a financial indicator that indicates when the user is below their spending budget, an audio input 230b for a financial indicator that indicates when the user has reached their spending budget, an audio input 228c for a financial indicator that indicates when the user is over their spending budget. In an embodiment, the user may select from a plurality of provided audio files, or may record a voice speaking into the user device 200 to provide an audio file as an audio financial indicator, and that audio file may be sent over the network from the user device for association with a predetermined spending budget status.

While a specific example of a financial indicator set-up screen 204 and financial indicator details screen 226 has been provided above that allows a user to set up one or more financial indicators and provide financial indictor details, a user is not required to set up a financial indicator. In an embodiment, an account provider, payment service provider, or other financial strength indication system provider may automatically provide financial indicators that are associated with spending budgets, financial accounts, property values, product details, and/or a variety of other financial entities belonging to the user. For example, a spending budget application may include an application icon that automatically includes a financial indicator associated with a spending budget created using the spending budget application, a financial account application may include an application icon that automatically includes a financial indicator associated with a financial account (e.g., a payment account, a stock or other securities account, a virtual currency account, etc.), a property value application may include an application icon that automatically includes a financial indicator associated with a piece of property, and a product selling application may include an application icon that automatically includes a financial indicator associated with details of products being sold. Furthermore, details of the financial indicators may be defaulted (e.g., for graphical display on an icon) and then adjustable by the user.

The method 100 then proceeds to block 104 where financial indicator(s) are associated with at least one account of the user in a database. As discussed above, a variety of different financial indicators may be associated with a variety of different user accounts at block 102. In an embodiment, the account provider device, payment service provider device, and/or other financial strength indication system provider device may receive the financial indicators, financial indicator details, and/or accounts at block 102 of the method 100 (e.g., over the network from the user device 200) and associated them in a database. In another embodiment, the financial indicators, financial indicator details, and accounts may be associated in a database in the user device 200. For example, a financial indicator may include a graphic that is displayed on an application icon and may be associated with one or more financial accounts, spending budgets, property values, or a product in a database. In another example, a financial indicator may include a graphic that is displayed on an application home page and may be associated with one or more financial accounts in a database. In yet another example, a plurality of financial indicators may include visual financial indicators and/or audio financial indicators that that may be provided on a payment terminal or user device in response to a payment request, and may be associated with one or more predetermined spending budget statuses in a database. While a few examples of the association of financial indicators and accounts, budgets, property, and products have been provided, financial indicators may be associated with any financial entities and/or financial details of a user while remaining within the scope of the present disclosure.

Referring now to FIGS. 1, 3a, 3b, 3c, 3d, and 4, embodiments of the method 100 that skip optional blocks 106 and 112 are illustrated and described below. In these embodiments, the method 100 proceeds from block 104 to block 108 where a current status associated with the at least one account is determined, and then to block 110 where a financial indicator is provided for display to the user.

Figure 3A:
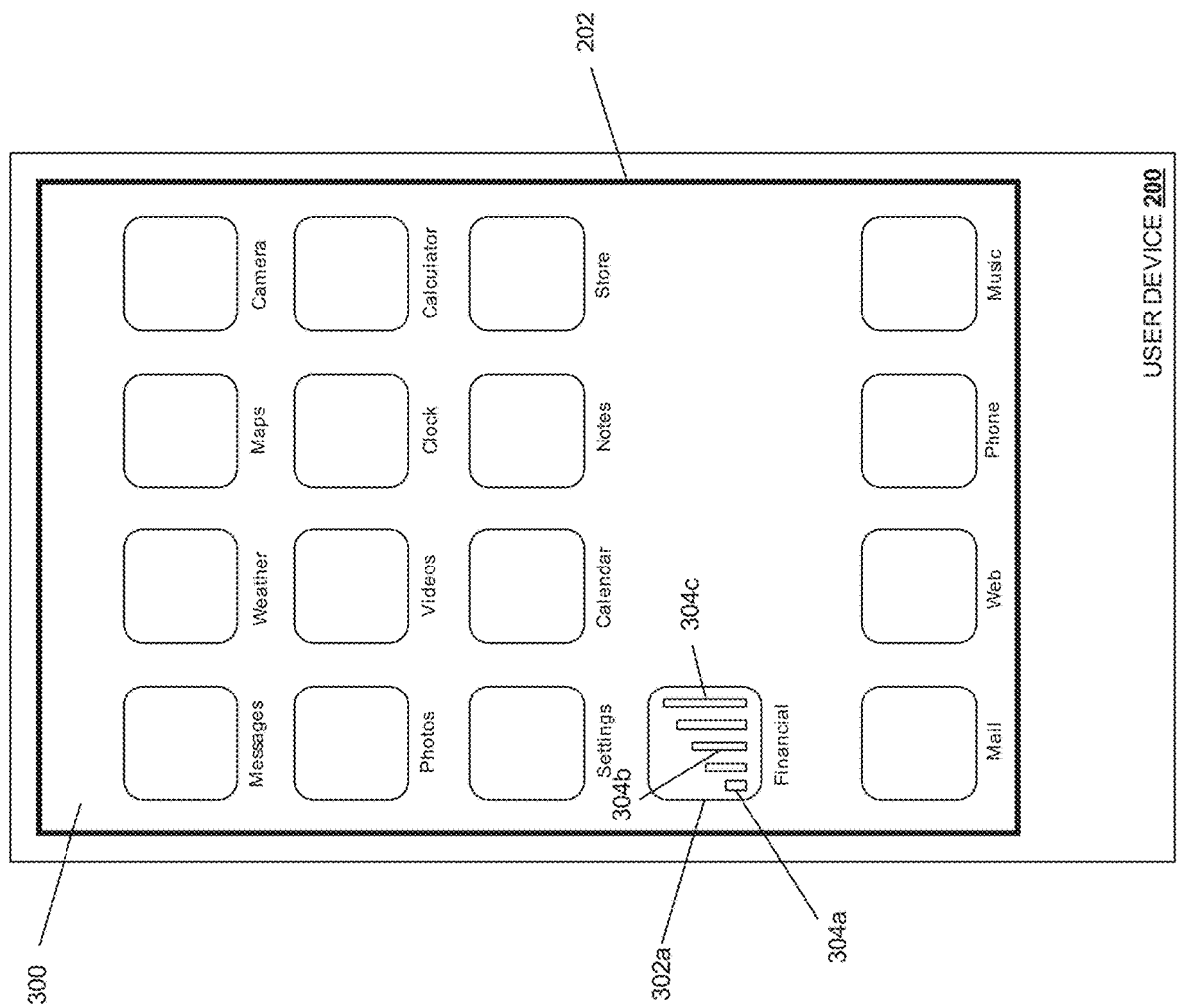
FIG. 3a is a front view illustrating an embodiment of a user device displaying a financial indicator.
Figure 3B:
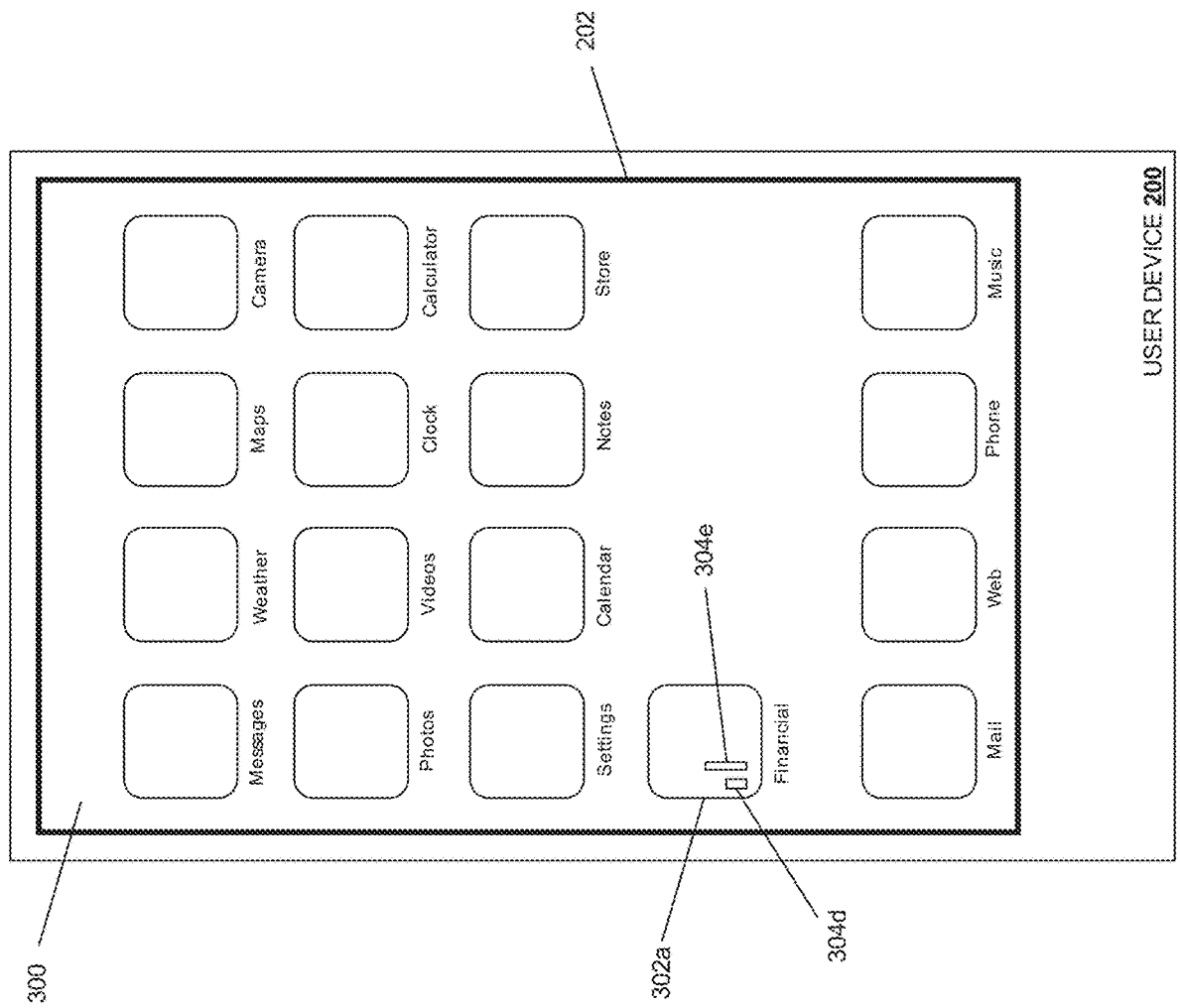
FIG. 3b is a front view illustrating an embodiment of a user device displaying a financial indicator.

For example, referring first to FIGS. 3a and 3b, the user device 200 is illustrated displaying a home page 300, or mobile device "springboard", that includes a plurality of application icons and/or user-created shortcut icons. The plurality of application icons and/or user-created shortcut icons include a financial application icon 302a. In this embodiment, a visual financial indicator for graphical display on the application icon 302a, as discussed above, has been associated with one or more financial accounts, a spending budget, a property value, or a product detail (e.g., a product bid number and bid details for a product listed on an auction), and is being displayed on the financial application icon 302a. Thus, at block 108, a current status associated with the one or more financial accounts, a spending budget, a property value, or a product detail may be retrieved by the user device 200, an account provider device, a payment service provider device, and/or a financial strength indication system provider device. Then, at block 110, the financial indicator may be modified so that it reflects the current status of the associated account, retrieved at block 108, and then provided for display on the display screen 202 of the user device 202 to the user on the financial application icon 302a.

For example, as illustrated in FIG. 3a, a current balance of a payment account may have been retrieved at block 108, and the visual financial indicator that is displayed as a graphic on the application icon 302a may be modified such that it includes a plurality of financial strength bars 304a, 304b, 304c, and so on, that reflect that current balance of the payment account. In an embodiment, the "full" and "empty" account balance values may be preset and/or adjusted by the user such that financial strength bars 304a, 304b, 304c, etc. provide an indication to the user of the financial strength of the user with regard to the payment account, but would not indicate to a third party viewing the application icon 302a/ financial indicator the current balance of the payment account. For example, the "full" account balance of the payment account may be set at $10,000 and the "empty" account balance of the payment account may be set at $100, and in the embodiment illustrated in FIG. 3a, the financial indicator on the financial application icon 302a would indicate to the user that their financial account is at or close to "full"/$10,000.

In another embodiment, the financial indicator on the application icon 302a illustrated in FIG. 3a may be associated with a plurality of payment accounts, and the financial strength bars 304a, 304b, 304c, etc. as illustrated would indicate to the user that those payment accounts are at a "full" account balance, whatever that amount has been set at. In another embodiment, the financial indicator on the application icon 302a illustrated in FIG. 3a may be associated with a spending budget, and the financial strength bars 304a, 304b, 304c, etc. as illustrated may indicate to the user that they have spent most of their budget for whatever time period the budget is associated with (e.g., the financial strength bars 304a, 304b, 304c, etc. are added as spending associated with the spending budget occurs), may indicate to the user that they have most of their spending budget left to spend (e.g., the financial strength bars 304a, 304b, 304c, etc. are taken away as spending associated with the spending budget occurs), and/or may provide other indications to the user as to the status of their spending budget depending on how the user has set up the financial indicator.

In another embodiment, the financial indicator on the application icon 302a illustrated in FIG. 3a may be associated with a property value or a plurality of property values, and the financial strength bars 304a, 304b, 304c, etc. as illustrated may indicate to the user that their property value is at a relatively high level (e.g., as set by the user similarly as discussed above, using averages of the property value over a predetermined time period, etc.) In yet another embodiment, the financial indicator on the application icon 302a illustrated in FIG. 3a may be associated with a product, and the financial strength bars 304a, 304b, 304c, etc. as illustrated may indicate to the user that offers or bids on that product are close to an asking price (or other user desired price) of the product. While a few examples have been provided, the financial strength bars 304a, 304b, 304c, etc. of the financial indicator illustrated in FIG. 3a may be applied to other accounts of a user including, but not limited to, stock or other security accounts, virtual currency accounts, and/or a variety of other accounts known in the art.

Furthermore, coloring or other visual indicators may be used to indicate the financial strength of a user including, but not limited to, providing financial strength bars 304a, 304b, 304c, etc. in a green color when the financial strength indication is relatively good, in a yellow color when the financial strength indication is relatively neutral, and in a red color when the financial strength indication is relatively bad.

Referring now to FIG. 3b, the determining of the current status associated with the at least one account at block 108 and the provision of the financial indicator for display to the user may occur periodically or continuously. For example, after the financial indicator including the financial strength bars 304a, 304b, and 304c has been displayed using the application icon 302a, as illustrated in FIG. 3a, a new current status of the at least one account may be retrieved and used to modify the financial indicator such that financial strength bars 304d and 304e are displayed on the application icon 302a, as illustrated in FIG. 3b.

Thus, in one of the examples provided above, the current balance of a payment account or plurality of payment accounts may have decreased, and that would be indicated to the user by displaying the financial indicator on the application icon 302a with less financial strength bars (e.g., the financial strength bars 304d and 304e in FIG. 3b relative to financial strength bars 304a, 304b, 304c, etc. in FIG. 3a.) In another of the examples provided above, the current status of a spending budget may have changed (e.g., the user may have spent in a manner associated with the spending budget), and that change would be indicated to the user by displaying the financial indicator on the application icon 302a with less financial strength bars (e.g., the financial strength bars 304d and 304e in FIG. 3b relative to financial strength bars 304a, 304b, 304c, etc. in FIG. 3a.) In another of the examples provided above, the value of property may have decreased, and that decrease would be indicated to the user by displaying the financial indicator on the application icon 302a with less financial strength bars (e.g., the financial strength bars 304d and 304e in FIG. 3b relative to financial strength bars 304a, 304b, 304c, etc. in FIG. 3a.) In another of the examples provided above, the bids on a product may have been withdrawn, and that withdrawal would be indicated to the user by displaying the financial indicator on the application icon 302a with less financial strength bars (e.g., the financial strength bars 304d and 304e in FIG. 3b relative to financial strength bars 304a, 304b, 304c, etc. in FIG. 3a.)

Figure 3C:
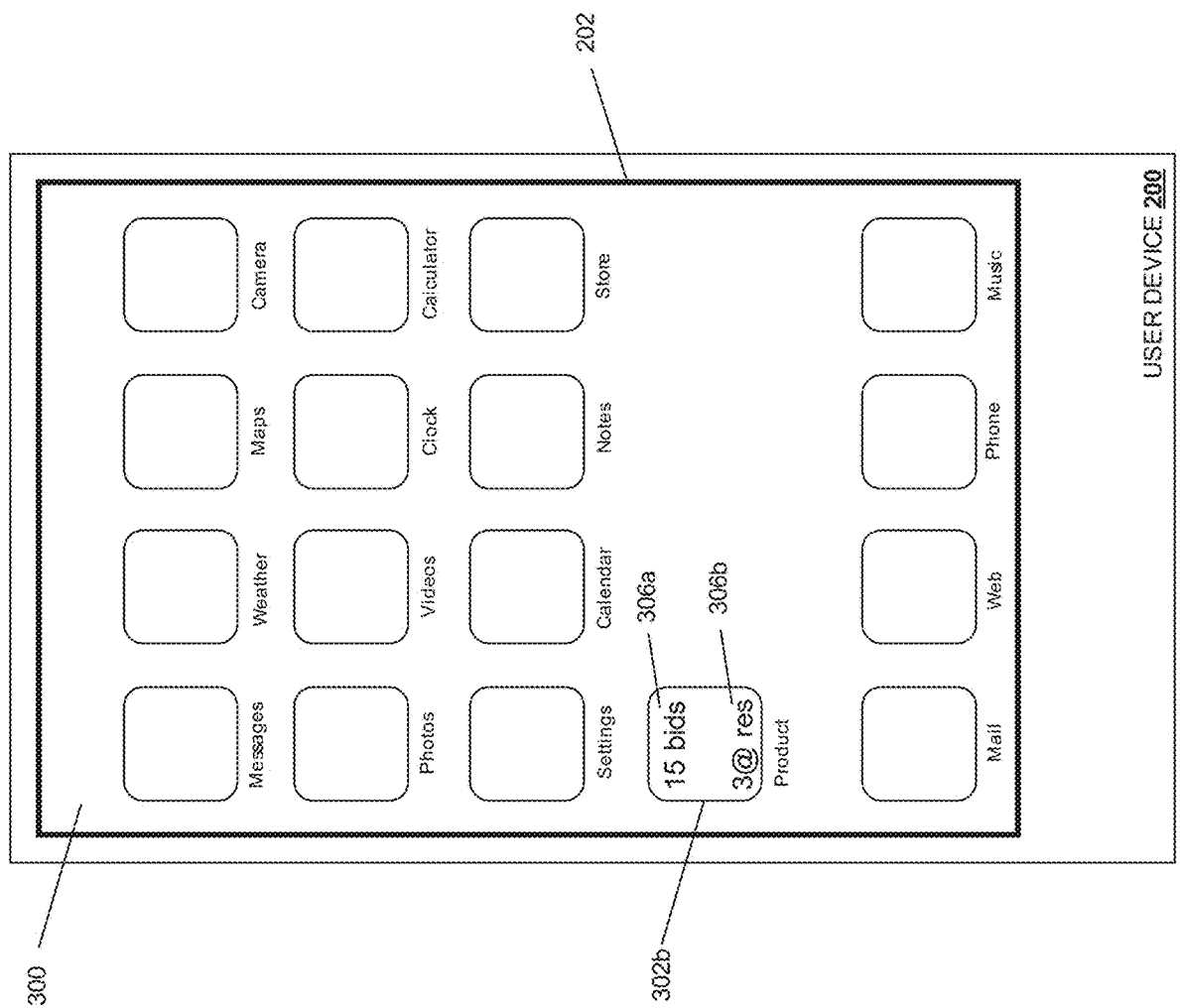
FIG. 3c is a front view illustrating an embodiment of a user device displaying a financial indicator.

In another example, as illustrated in FIG. 3c, product details associated with the attempted sale of a product (e.g., a product auction in the illustrated embodiment) may have been retrieved at block 108, and the visual financial indicator that is provided for display to the user includes a graphic on a product application icon 302b that may be modified such that it includes a plurality of product details 306a and 306b that reflect the current status of the product sale. In the illustrated embodiment, the product detail 306a indicates to a user that a product they have for sale at auction has received 15 bids, and the product detail 306b indicates to the user that 3 of those bids are at the reserve price of the product (e.g., the lowest price at which the user is willing to sell the product.) As discussed above with reference to FIGS. 3a and 3b, blocks 108 and 110 may be periodically or continuously performed to update the product details 306a and 306b of the financial indicator displayed on the product application icon 302b as details associated with the product change.

Figure 3D:
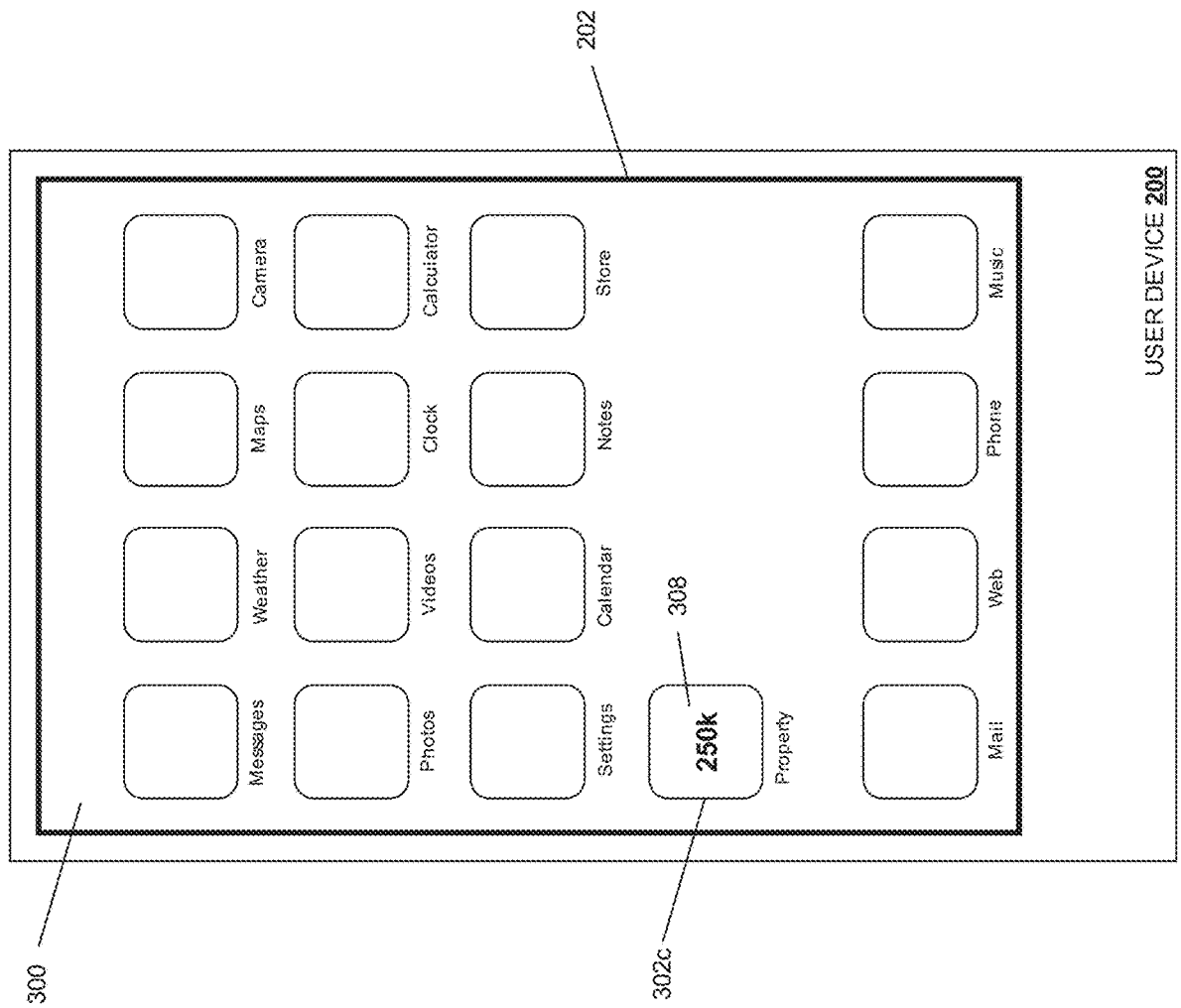
FIG. 3d is a front view illustrating an embodiment of a user device displaying a financial indicator.

In another example, as illustrated in FIG. 3d, a property value or property values may have been retrieved at block 108, and the visual financial indicator that is provided for display to the user includes a graphic on a property application icon 302c that may be modified such that it includes a numerical financial indicator 308 that reflects the current value of a piece of property or plurality of pieces of property. In the illustrated embodiment, the numerical financial indicator 308 indicates to a user that the property or properties associated with the financial indicator are currently valued at $250,000. As discussed above with reference to FIGS. 3a and 3b, blocks 108 and 110 may be periodically or continuously performed to update the numerical value 308 for the property value or values on the financial indicator displayed on the property application icon 302c as that property value or those property values change.

Figure 4:
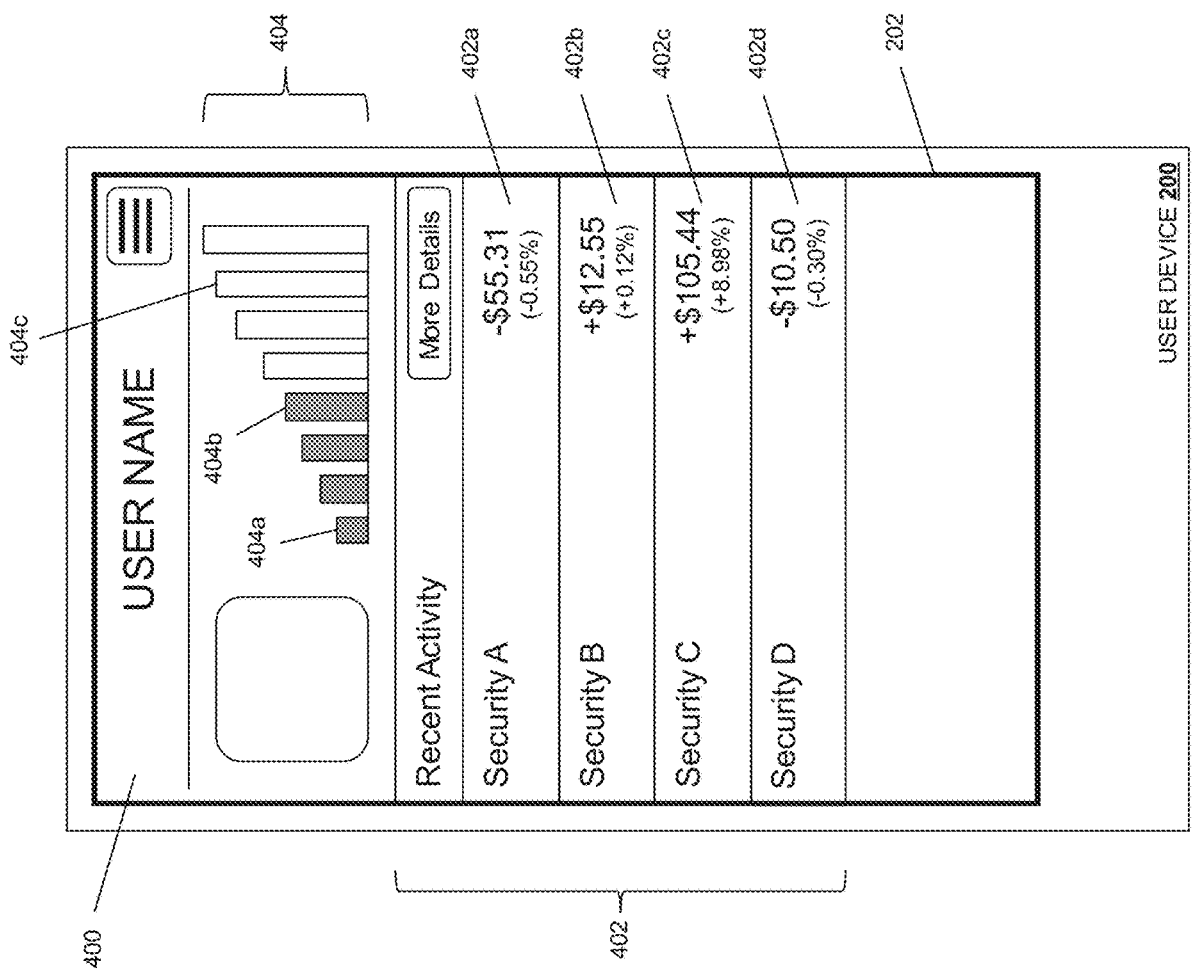
FIG. 4 is a front view illustrating an embodiment of a user device displaying a financial indicator.

In another example, referring now to FIG. 4, the user device 200 is illustrated displaying an account application home page 400 that includes a stock or securities account activity section 402 having a plurality of account activities 402a, 402b, 402c, and 402d. The account application home page 400 also includes a financial indicator 404 having a plurality of financial strength bars 404a, 404b, 404c, etc. that may be "filled"/colored or empty/unfilled/uncolored. In this embodiment, a visual financial indicator for graphical display on an application home page 400, as discussed above, has been associated with one or more stock or security accounts and is being displayed on the account application home page 400. Thus, at block 108, a current status associated with the one or more stock or security accounts may be retrieved by the user device 200, an account provider device, a payment service provider device, and/or a financial strength indication system provider device. Then, at block 110, the financial indicator 404 may be modified so that it reflects the current status retrieved at block 108 and provided for display to the user on the account application home page 400.

For example, as illustrated in FIG. 4, a current balance of a stock or security account may have been retrieved at block 108, and the financial indicator 404 that is displayed as a graphic on the account application home page 400 may be modified such that financial strength bars 404a, 404b, 404c, etc. are "filled"/colored and empty/unfilled/uncolored to reflect that current balance of the stock or security account. In an embodiment, the "full" and "empty" account balance values may be preset and/or adjusted by the user such that financial strength bars 404a, 404b, 404c, etc. provide an indication to the user of the financial strength with regard to the stock or security account, but would not indicate to a third party viewing the account application home page 400/financial indicator the current balance of the stock or security account. For example, the "full" account balance of the stock or security account may be set at $100,000 and the "empty" account balance of the stock or security account may be set at $10,000, and in the embodiment illustrated in FIG. 3a, the financial indicator 404 on the payment application home page 400 would indicate to the user that their stock or security account is approximately half full or at $50,000. As discussed above with reference to FIGS. 3a and 3b, blocks 108 and 110 may be periodically or continuously performed to update the financial indicator 404 on the account application home page 400 with "filled"/colored and empty/unfilled/uncolored financial strength bars 404a, 404b, 404c, etc. such that the financial indicator 404 displayed on the account application home page 400 reflects the changing value of the stock or security account or accounts.

Referring now to FIGS. 1, 5a, 5b, and 5c, an embodiment of the method 100 that includes optional blocks 106 and 112 is illustrated and described below. In this embodiment, a plurality of financial indicators have been associated with predetermined spending budget statuses for a spending budget associated with one or more payment accounts of the user, as discussed above. Following block 104, the method 100 proceeds to block 106 where a payment request is received from a user. In the illustrated embodiment, a payment terminal 500 including a display screen 502 and a speaker 504 or other audio device is provided to the user for making a payment for purchases. For example, a merchant may provide a merchant device that includes the payment terminal 500 at a point-of-sale as part of a self check-out system in which the user scans products for purchase and provides payment using the payment terminal 500, a credit card check-out system in which the merchant scans products or inputs services into the system and the user provides payment using the payment terminal 500, and/or a variety of other merchant devices known in the art for providing payment by a user to a merchant. The payment terminal 500 may be provided by the user device 200 for the user to provide payments over a network (e.g., the user may use a mobile phone that displays the details illustrated in FIG. 5a as being displayed on the payment terminal 500.)

At block 106, the user may provide a payment instrument to the payment terminal 500 in order to make a payment request to make a payment from a user payment account to a merchant account for products and/or services that the user is purchasing from the merchant. For example, the user may present a credit card, debit card, or other payment instrument known in the art to the payment terminal to send the payment request from a respective credit account, debit account, and/or other account. In another example, the payment terminal 500 may be the user device 200 discussed above, and the user may use a payment application on the user device 200/payment terminal 500 to select a user payment account and/or otherwise make a payment request to make a payment using the user payment account. The payment request is then sent over the network and received by an account provider device, payment service provider device, and/or financial strength indication system device.

The method 100 then proceeds to block 108 where a current status associated with the at least one account is retrieved. In an embodiment, upon receiving the payment request, the account provider device, payment service provider device, and/or financial strength indication system device will determine the user payment account that is associated with the payment request. The user payment account may then be used to retrieve the current status of that payment account and/or of one or more other payment accounts of the user, which may include a current balance of the payment account, a current balance of the plurality of payment accounts, a current spending budget status associated with a spending budget that uses funds in the payment account, a current spending budget status associated with a spending budget the uses funds in the plurality of payment accounts, and/or a variety of other current payment account statuses known in the art. In the example illustrated in FIGS. 5a, 5b, and 5c, a current spending budget status for one or more payment accounts is retrieved by retrieving a plurality of spending details related to purchases made over a time period (i.e., according to a spending budget set by the user) using the one or more payment accounts.

Figure 5A:
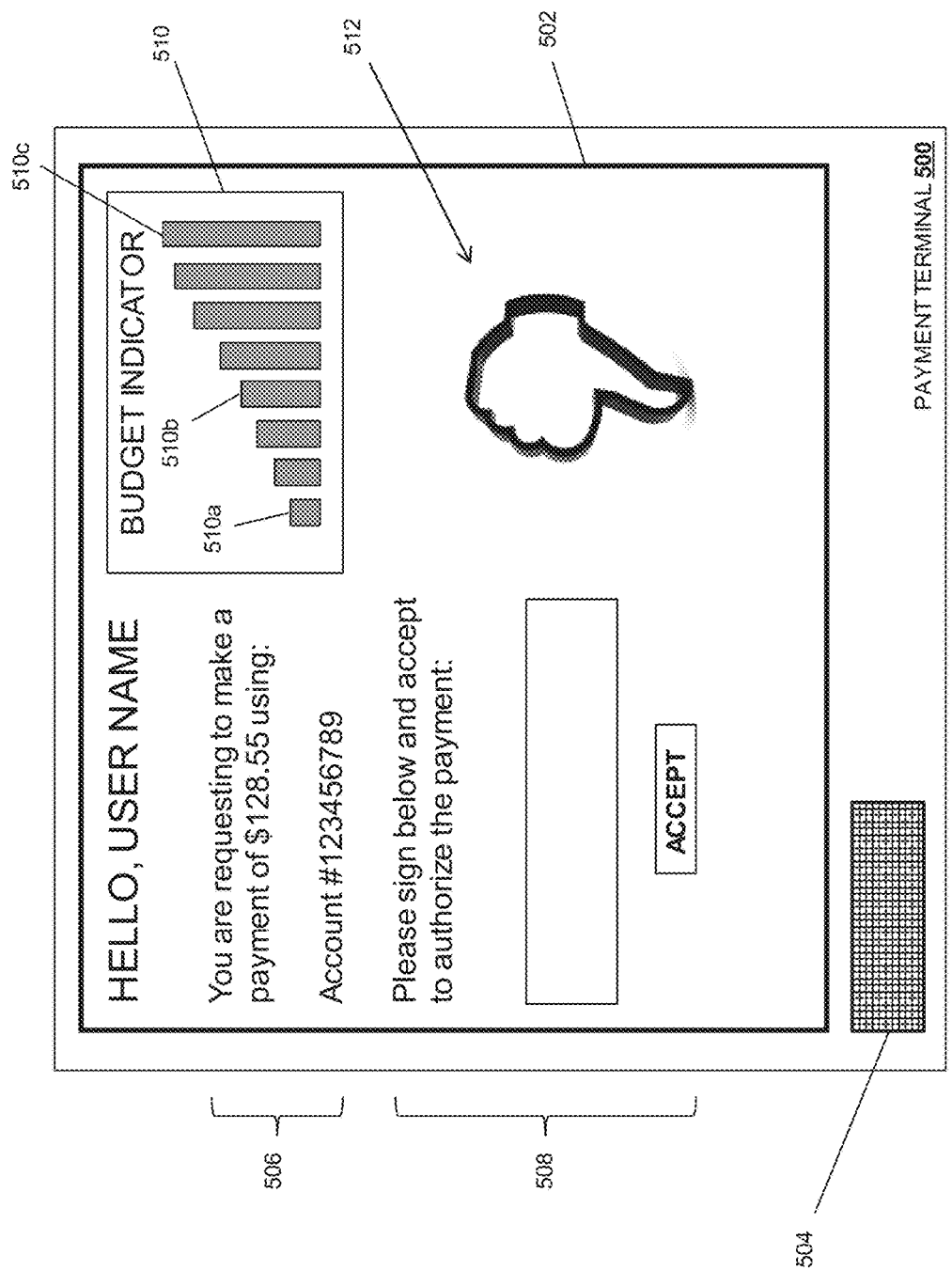
FIG. 5a is a front view illustrating an embodiment of a payment terminal providing a financial indicator in response to a payment request being made.

The method 100 then proceeds to block 110 where a financial indicator is provided for display to the user. In an embodiment, the current spending budget status determined in block 108 may be compared to a plurality of predetermined spending budget statuses that are associated with the payment account being used to make the payment request in order to determine which of the predetermined spending budget statuses include the current spending budget status. FIG. 5a illustrates a situation in which the current spending budget status retrieved at block 108 is included in a predetermined spending budget status that is associated with a financial indicator that indicates to the user that they are above their spending budget.

The payment terminal 500 in FIG. 5a is displaying a payment request detail section 506 that includes an amount of the payment request, a user payment account identifier associated with the payment request, and may include a variety of other payment request details known in the art. The payment terminal 500 is also displaying an authorization section 508 that allows the user to authorize the payment request (e.g., by signing and selecting an accept button), discussed in further detail below. The payment terminal 500 may also display a financial indicator 510 that may have been determined by comparing the current spending budget status determined at block 108 to a spending budget associated with the payment account being used to make the payment request and which, in the illustrated embodiment, includes a plurality of financial strength indicator bars 510a, 510b, 510c, etc. that have been "filled"/colored to indicate that the user is over their spending budget.

The payment terminal 500 or other financial indicator provisioning device may also display a visual financial indicator 512 that has been provided for display to the user by comparing the current spending budget status determined at block 108 to the plurality of predetermined spending budgets (e.g., set at block 102) and retrieving the financial indicator associated with the predetermined spending budget status that includes the current budget status. In the illustrated embodiment, the visual financial indicator 512 includes an image selected or provided by the user (e.g., as discussed above with reference to FIG. 2b) to indicate to the user that they are above the spending budget, which includes a "thumbs down" image in the illustrated embodiment, but may include video, animated graphics, and/or any other visual media the user may have a negative association with. The payment terminal 500 or other financial indicator provisioning device may also provide an audio financial indicator to the user using the speaker 504 or other audio device by comparing the current spending budget status determined at block 108 to the plurality of predetermined spending budgets (e.g., set at block 102) and retrieving the audio financial indicator associated with the predetermined spending budget status that includes the current budget status. The audio financial indicator 512 includes an audio clip selected or provided by the user (e.g., as discussed above with reference to FIG. 2b) to indicate to the user that they are above the spending budget, which may include sad music, a voice recorded by the user (e.g., "Stop spending money!"), and/or any audio that the user may have a negative association with. Thus, FIG. 5a illustrates how the system may, upon receiving a payment request from a user, provide the user with financial indicators that indicate to the user that they are above a spending budget, and may provide negative images and/or audio that discourage further spending that is above that spending budget.

Figure 5B:
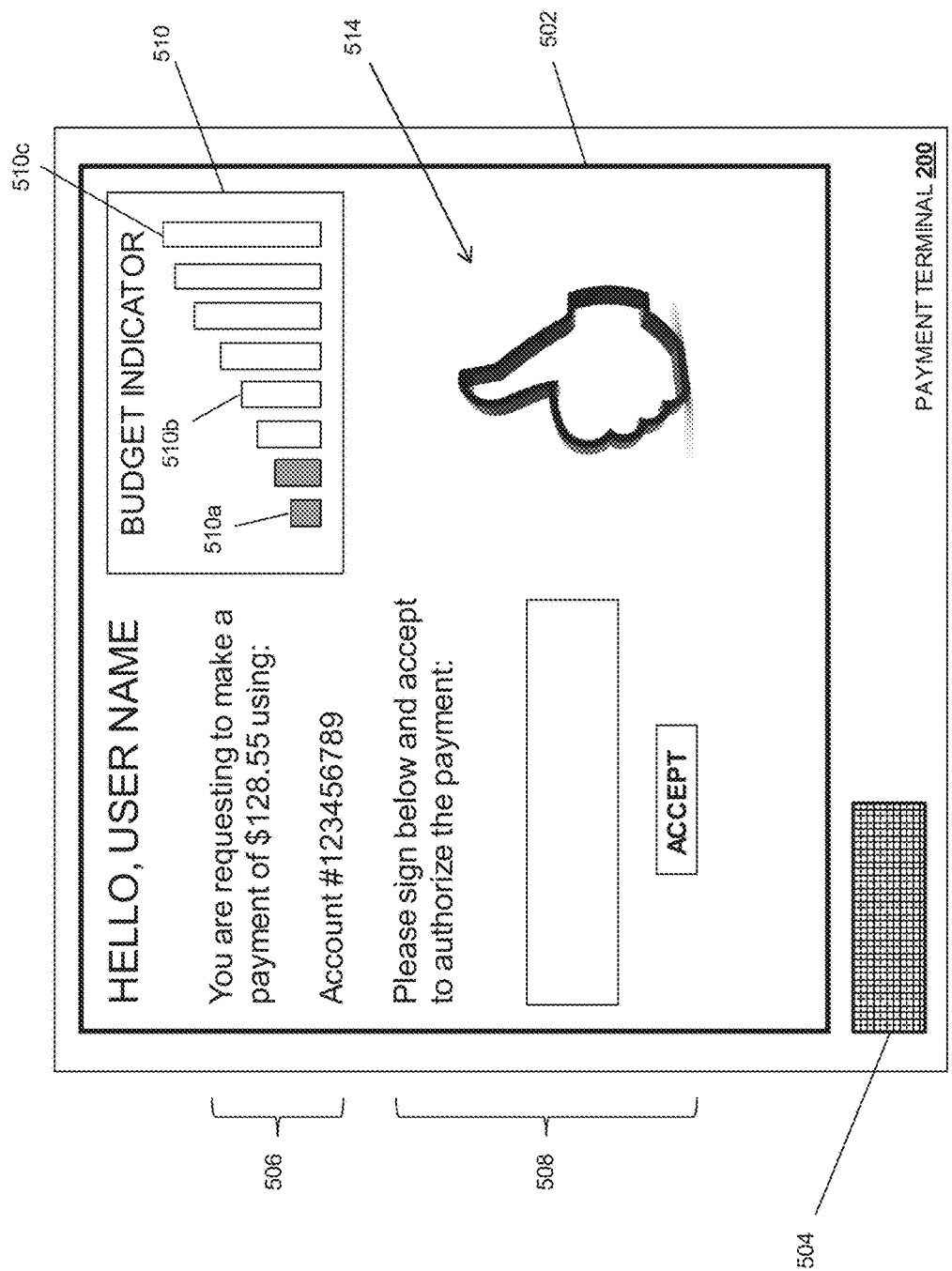
FIG. 5b is a front view illustrating an embodiment of a payment terminal providing a financial indicator in response to a payment request being made.

FIG. 5b illustrates a situation in which the current spending budget status retrieved at block 108 is included in a predetermined spending budget status that is associated with a financial indicator that indicates to the user that they are below their spending budget. The payment terminal 500 in FIG. 5b is displaying the same payment request detail section 506 and authorization section 508 as discussed above. However, the payment terminal 500 may also display the financial indicator 510 that may have been determined by comparing the current spending budget status determined at block 108 to spending budget associated with the payment account being used to make the payment request and which, in the illustrated embodiment, includes the plurality of financial strength indicator bars 510a, 510b, 510c, etc. that have been "filled"/colored to indicate that the user is below their spending budget.

The payment terminal 500 or other financial indicator provisioning device may also display a visual financial indicator 514 that has been provided for display to the user by comparing the current spending budget status determined at block 108 to the plurality of predetermined spending budgets (e.g., set at block 102) and retrieving the financial indicator associated with the predetermined spending budget status that includes the current budget status. In the illustrated embodiment, the visual financial indicator 512 includes an image selected or provided by the user (e.g., as discussed above with reference to FIG. 2b) to indicate to the user that they are below the spending budget, which includes a "thumbs up" image in the illustrated embodiment, but may include video, animated graphics, and/or any other visual media the user may have a positive association with. The payment terminal 500 or other financial indicator provisioning device may also provide an audio financial indicator to the user using the speaker 504 or other audio device by comparing the current spending budget status determined at block 108 to the plurality of predetermined spending budgets (e.g., set at block 102) and retrieving the audio financial indicator associated with the predetermined spending budget status that includes the current budget status. The audio financial indicator 512 includes an audio clip selected or provided by the user (e.g., as discussed above with reference to FIG. 2b) to indicate to the user that they are below the spending budget, which may include happy music, a voice recorded by the user (e.g., "Nice job!"), and/or any audio that the user may have a positive association with. Thus, FIG. 5b illustrates how the system may, upon receiving a payment request from a user, provide the user with financial indicators that indicate to the user that they are below a spending budget, and may provide positive images and/or audio that indicate to the user that further spending within the spending budget is okay.

Figure 5C:
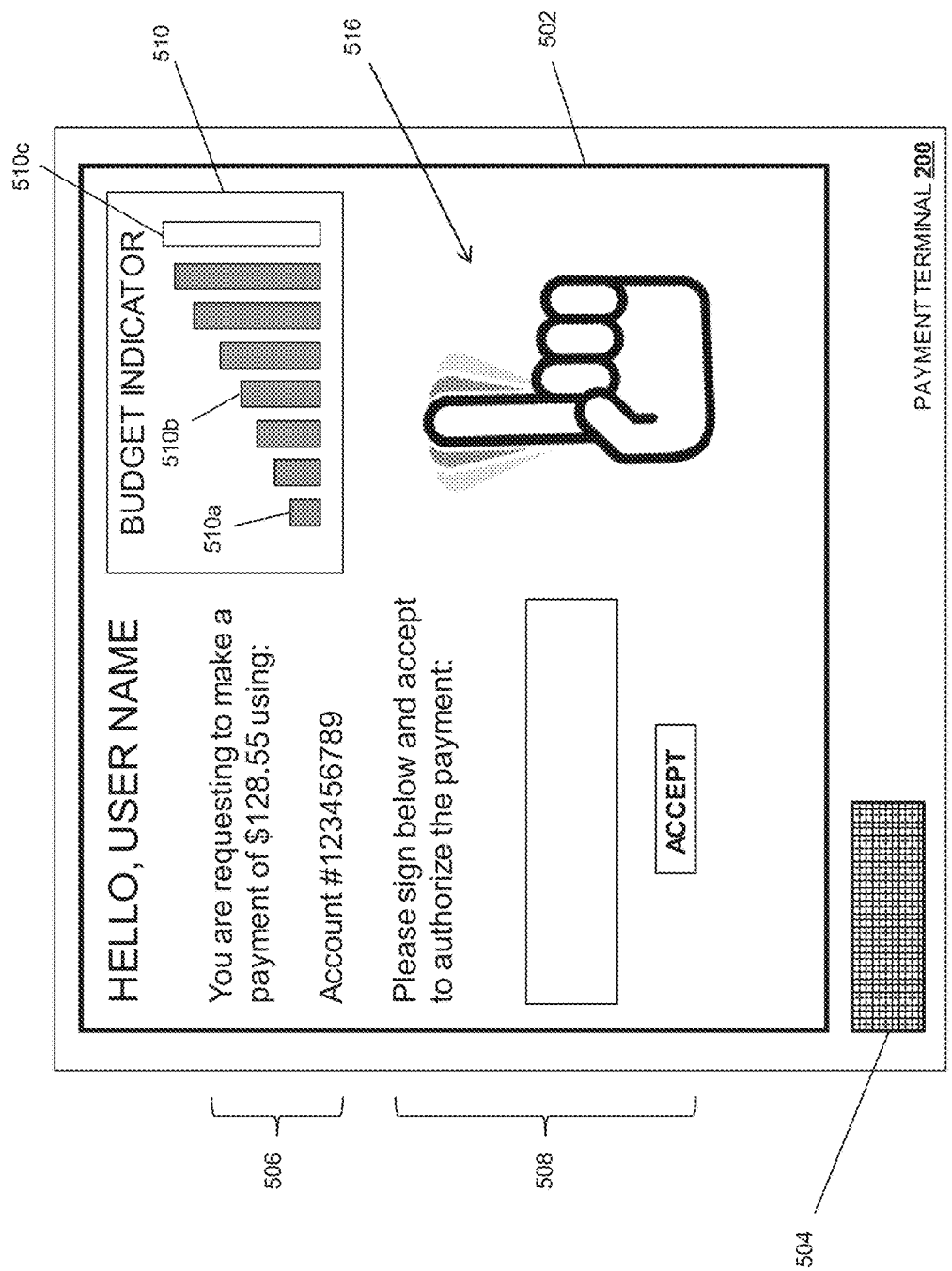
FIG. 5c is a front view illustrating an embodiment of a payment terminal providing a financial indicator in response to a payment request being made.

FIG. 5c illustrates a situation in which the current spending budget status retrieved at block 108 is included in a predetermined spending budget status that is associated with a financial indicator that indicates to the user that they have reached their spending budget. The payment terminal 500 in FIG. 5c is displaying the same payment request detail section 506 and authorization section 508 as discussed above. However, the payment terminal 500 may also display the financial indicator 510 that may have been determined by comparing the current spending budget status determined at block 108 to spending budget associated with the payment account being used to make the payment request and which, in the illustrated embodiment, includes the plurality of financial strength indicator bars 510a, 510b, 510c, etc. that have been "filled"/colored to indicate that the user has reached their spending budget.

The payment terminal 500 or other financial indicator provisioning device may also display a visual financial indicator 516 that has been provided for display to the user by comparing the current spending budget status determined at block 108 to the plurality of predetermined spending budgets (e.g., set at block 102) and retrieving the financial indicator associated with the predetermined spending budget status that includes the current budget status. In the illustrated embodiment, the visual financial indicator 512 includes an image selected or provided by the user (e.g., as discussed above with reference to FIG. 2*b*) to indicate to the user that they have reached their spending budget, which includes a "webbing finger" image in the illustrated embodiment, but may include video, animated graphics, and/or any other visual media the user may associate with a warning The payment terminal 500 may also provide an audio financial indicator to the user using the speaker 504 or other audio device by comparing the current spending budget status determined at block 108 to the plurality of predetermined spending budgets (e.g., set at block 102) and retrieving the audio financial indicator associated with the predetermined spending budget status that includes the current budget status. The audio financial indicator 512 includes an audio clip selected or provided by the user (e.g., as discussed above with reference to FIG. 2*b*) to indicate to the user that they have reached their spending budget, which may include a warning sound, a voice recorded by the user (e.g., "Watch it!"), and/or any audio that the user may associate with a warning. Thus, FIG. 5*c* illustrates how the system may, upon receiving a payment request from a user, provide the user with financial indicators that indicate to the user that they have reached a spending budget, and may provide warning images and/or audio that indicate to the user that that they should be cautious with further spending associated with the spending budget.

The method 100 then may proceed to block 112 where user payment authorization may be received. In some situations, it is expected that a user will receive warning images/audio and/or negative images/audio and decide not to make the payment, in which case block 112 of the method 100 will be skipped. However, upon receiving positive images/audio, the user may use the authorization section 508 to send an authorization over the network to make the payment according to the payment request to the account provider device or payment service provider device, which will cause a transfer of funds from the user payment account to a merchant account of the merchant.

Thus, a system and method for providing an indication of financial strength has been described that associates visual and/or audio financial indicators with accounts of a user that may include financial accounts, spending budgets associated with financial accounts, property, products, and/or a variety of other financial entities known in the art. Users may be provided with the financial indicator as quickly referenced indicator of their financial strength as it relates to one or more financial accounts, spending budgets, owned property, products for sale, etc. Users may also be provided with financial indicator upon making a payment request for a purchase to encourage good spending behavior and discourage bad spending behavior (e.g., according to balances in payment accounts, statuses of spending budget, etc.)

Figure 6:
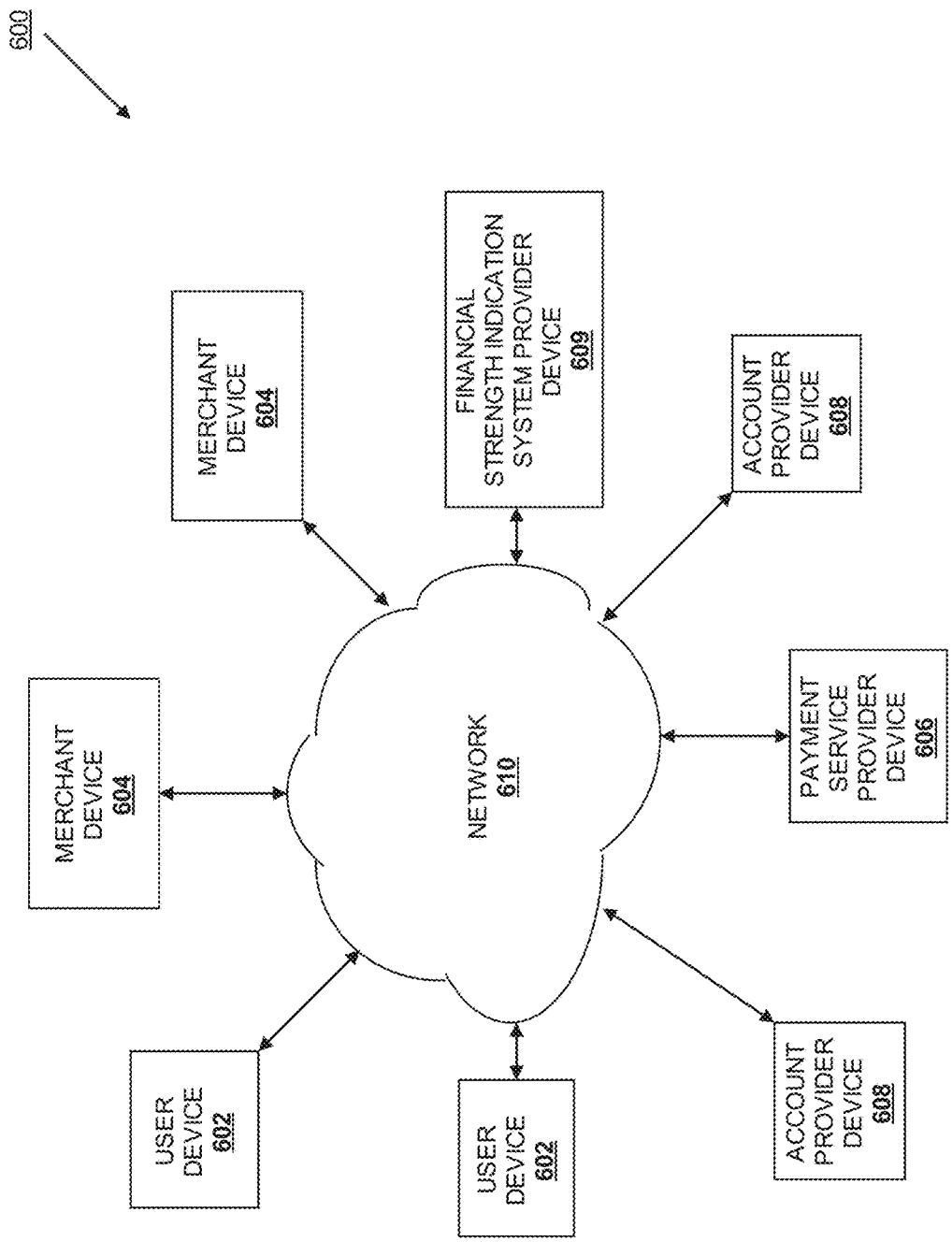
FIG. 6 is a schematic view illustrating an embodiment of a networked system.

Referring now to FIG. 6, an embodiment of a networked system 600 used in the financial strength indication system described above is illustrated. The networked system 600 includes a plurality of user devices 602, a plurality of merchant devices 604, a payment service provider device 606, a plurality of account holder devices 608, and a financial strength indication system provider device 609 in communication over a network 610. Any of the user devices 602 may be the user device 200, discussed above. The merchant devices 604 may be the merchant devices discussed above (e.g., including the payment terminal 500) and may be operated by the merchants discussed above. The payment service provider device 606 may be the payment service provider devices discussed above and may be operated by a payment service provider such as, for example, PayPal Inc. of San Jose, Calif. The account provider devices 608 may be the account provider devices discussed above and may be operated by the account providers discussed above such as, for example, credit card account providers, bank account providers, savings account providers, and a variety of other account providers known in the art. The financial strength indication system provider device 609 may be the financial strength indication system provider devices discussed above and may be operated by the financial strength indication system providers discussed above.

The user devices 602, merchant devices 604, payment service provider device 606, account provider devices 608, and/or financial strength indication system provider device 609 may each include one or more processors, memories, and other appropriate components for executing instructions such as program code and/or data stored on one or more computer readable mediums to implement the various applications, data, and steps described herein.

For example, such instructions may be stored in one or more computer readable mediums such as memories or data storage devices internal and/or external to various components of the system 600, and/or accessible over the network 610.

The network 610 may be implemented as a single network or a combination of multiple networks. For example, in various embodiments, the network 610 may include the Internet and/or one or more intranets, landline networks, wireless networks, and/or other appropriate types of networks.

The user device 602 may be implemented using any appropriate combination of hardware and/or software configured for wired and/or wireless communication over network 610. For example, in one embodiment, the user device 602 may be implemented as a personal computer of a user in communication with the Internet. In other embodiments, the user device 602 may be a smart phone, personal digital assistant (PDA), laptop computer, and/or other types of computing devices.

The user device 602 may include one or more browser applications which may be used, for example, to provide a convenient interface to permit the user to browse information available over the network 610. For example, in one embodiment, the browser application may be implemented as a web browser configured to view information available over the Internet.

The user device 602 may also include one or more toolbar applications which may be used, for example, to provide user-side processing for performing desired tasks in response to operations selected by the user. In one embodiment, the toolbar application may display a user interface in connection with the browser application.

The user device 602 may further include other applications as may be desired in particular embodiments to provide desired features to the user device 602. In particular, the other applications may include a payment application for payments assisted by a payment service provider through the payment service provider device 606. The other applications may also include security applications for implementing user-side security features, programmatic user applications for interfacing with appropriate application programming interfaces (APIs) over the network 610, or other types of applications. Email and/or text applications may also be included, which allow the payer to send and receive emails and/or text messages through the network 610. The user device 602 includes one or more user and/or device identifiers which may be implemented, for example, as operating system registry entries, cookies associated with the browser application, identifiers associated with hardware of the user device 602, or other appropriate identifiers, such as a phone number. In one embodiment, the user identifier may be used by the payment service provider device 606 and/or account provider device 608 to associate the user with a particular account as further described herein.

The merchant device 604 may be maintained, for example, by a conventional or on-line merchant, conventional or digital goods seller, individual seller, and/or application developer offering various products and/or services in exchange for payment to be received conventionally or over the network 610. In this regard, the merchant device 604 may include a database identifying available products and/or services (e.g., collectively referred to as items) which may be made available for viewing and purchase by the user.

The merchant device 604 also includes a checkout application which may be configured to facilitate the purchase by the payer of items. The checkout application may be configured to accept payment information from the user through the user device 602, the account provider through the account provider device 608, and/or from the payment service provider through the payment service provider device 606 over the network 610.

Figure 7:
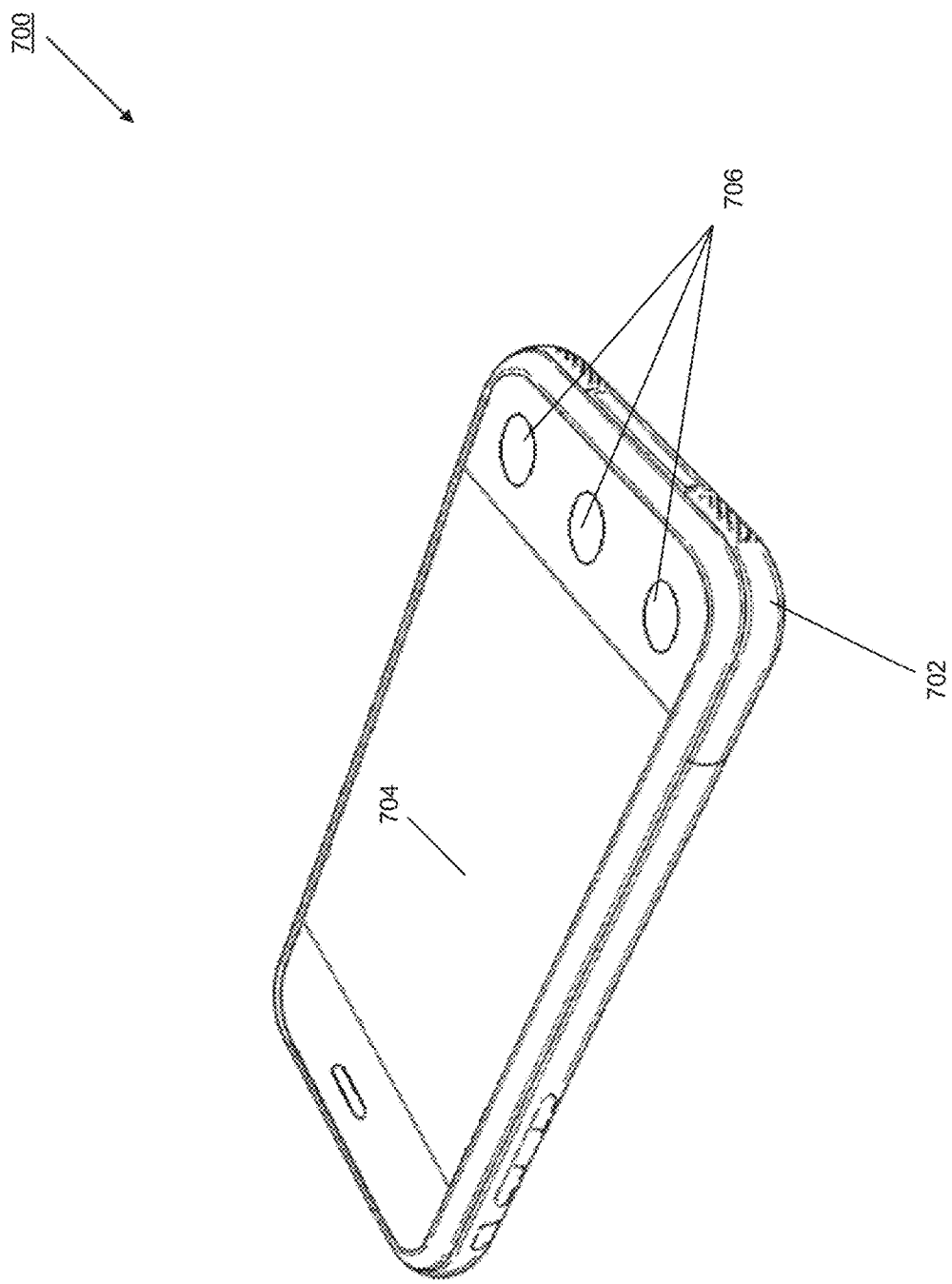
FIG. 7 is a perspective view illustrating an embodiment of a user device.

Referring now to FIG. 7, an embodiment of a user device 700 is illustrated. The user device 700 may be the user devices 200 and/or 602. The user device 700 includes a chassis 702 having a display 704 and an input device including the display 704 and a plurality of input buttons 706. One of skill in the art will recognize that the user device 700 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 8:
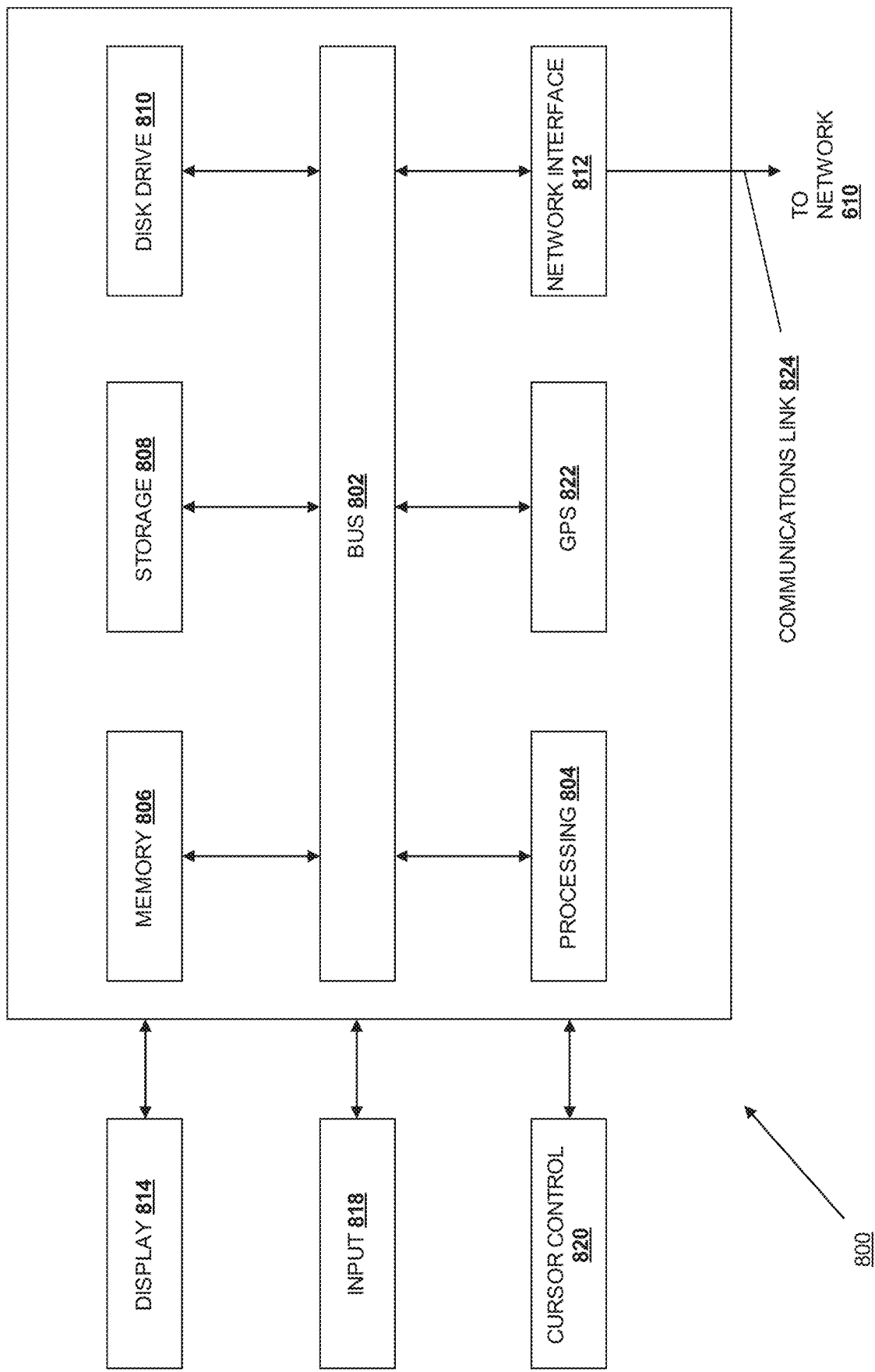
FIG. 8 is a schematic view illustrating an embodiment of a computer system.

Referring now to FIG. 8, an embodiment of a computer system 800 suitable for implementing, for example, the user device 200, the user device 602, the user device 700, the merchant device 604, the payment service provider device 606, the account provider device 608, and/or the financial strength indication system provider device 609 is illustrated. It should be appreciated that other devices utilized by users, merchants, payment service providers, account providers, and other financial strength indication system providers in the financial strength indication system discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), and/or a location determination component 822 (e.g., a Global Positioning System (GPS) device as illustrated, a cell tower triangulation device, and/or a variety of other location determination devices known in the art.) In one implementation, the disk drive component 810 may comprise a database having one or more disk drive components.

In accordance with embodiments of the present disclosure, the computer system 800 performs specific operations by the processor 804 executing one or more sequences of instructions contained in the memory component 806, such as described herein with respect to the user device 200, 602, and 700, the merchant device(s) 604, the payment service provider device 606, the account provider device(s) 608, and/or the financial strength indication system provider device 609. Such instructions may be read into the system memory component 806 from another computer readable medium, such as the static storage component 808 or the disk drive component 810. In other embodiments, hardwired circuitry may be used in place of or in combination with software instructions to implement the present disclosure.

Logic may be encoded in a computer readable medium, which may refer to any medium that participates in providing instructions to the processor 804 for execution. Such a medium may take many forms, including but not limited to, non-volatile media, volatile media, and transmission media. In an embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by the computer system 800. In various other embodiments of the present disclosure, a plurality of the computer systems 800 coupled by a communication link 824 to the network 610 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Figure 9:
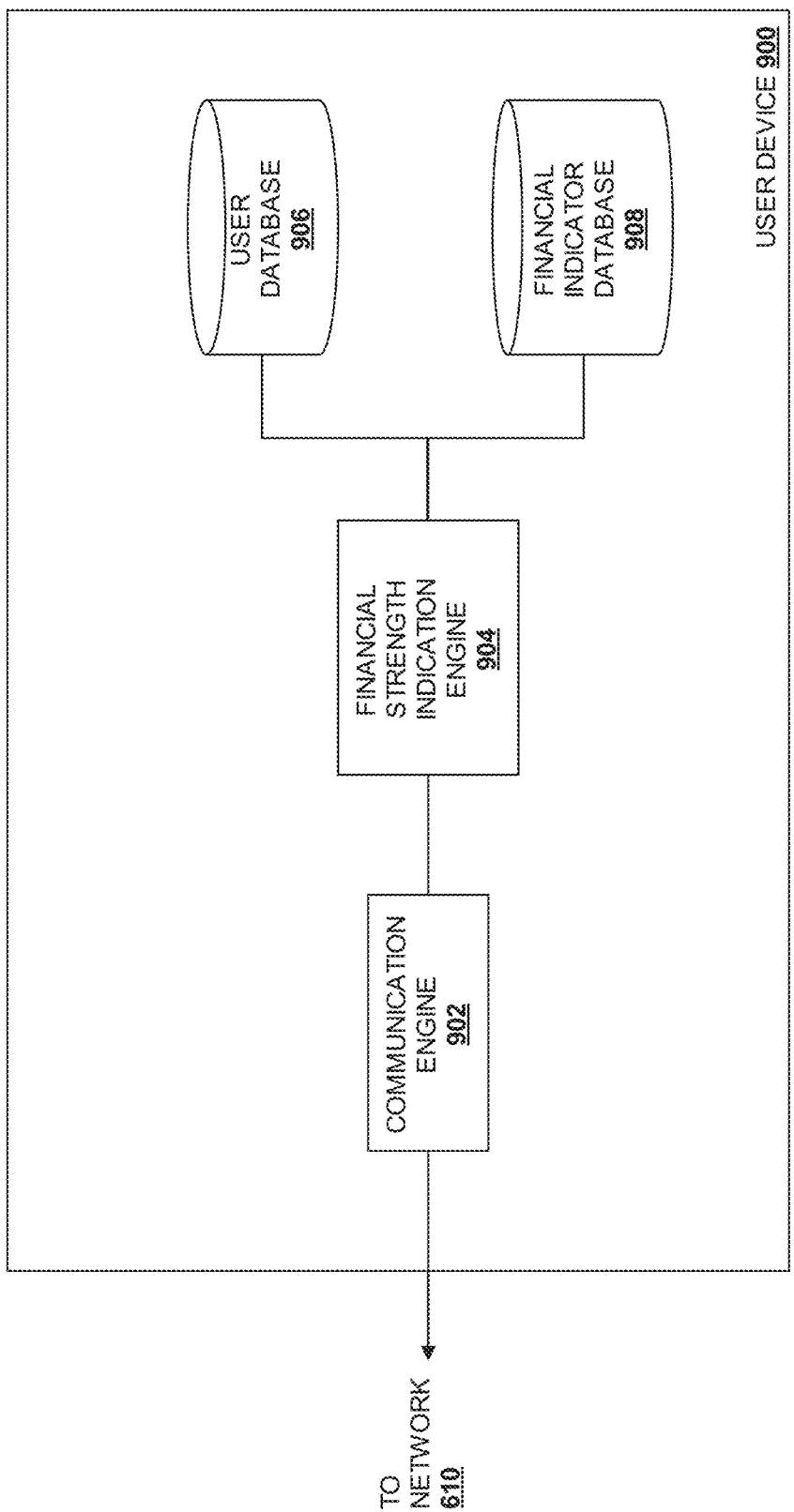
FIG. 9 is a schematic view illustrating an embodiment of a financial strength indication system provider device.

Referring now to FIG. 9, an embodiment of a financial strength indication system provider device 900 is illustrated. In an embodiment, the device 900 may be the user device 200, 602, and 700, the payment service provider device 606, the account provider device 608, and/or a third party device.

The device 900 includes a communication engine 902 that is coupled to the network 610 and to a financial strength indication engine 904 that is coupled to a user database 906 and a financial indicator database 908. The communication engine 902 may be software or instructions stored on a computer-readable medium that allows the device 900 to send and receive information over the network 610. The financial strength indication engine 904 may be software or instructions stored on a computer-readable medium that is operable to receive financial indicators, associate financial indicators in the financial indicator database 908 with payment accounts in the user database 906, receive payment requests, determine a current status of accounts of a user in the user database 906, compare the current status of spending budgets of a user to predetermined statuses in the financial indicator database 908, provide financial indicators for display to the user, and provide any of the other functionality that is discussed above. While the databases 906 and 908 has been illustrated as located in the device 900, one of skill in the art will recognize that they may be connected to the financial strength indication system provider device 900 through the network 210 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on users and merchants; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   accessing, by a processor, an account update indicating at least one change to a financial indicator associated with a user account of a user of a mobile device, the user account associated with a user budget with a user-selected budget goal and an account balance;
   determining, by the processor based on analysis of the user budget with the account update, to modify at least one of a plurality of financial strength indicators of a financial indicator graphic for the financial indicator, the financial indicator graphic associated with an application icon for an application of a mobile device, the application configured to display detailed information for the user account upon execution of the application, the financial indicator graphic displayed on the application icon and indicating a current status of the financial indicator;
   generating, by the processor based on the determining to modify the at least one of the plurality of financial strength indicators, a new layout of the plurality of financial strength indicators of the financial indicator graphic, the new layout being different from an initial layout displayed by the application icon prior to said accessing the account update;
   communicating, by the processor, the new layout to the mobile device for the financial indicator graphic of the application icon to include the modified at least one of the plurality of financial strength indicators in the new layout, wherein the financial indicator graphic is modifiable to indicate subsequent changes to the user-selected budget goal;
   detecting, by the processor, a transaction processing parameter associated with the financial indicator, wherein the transaction processing parameter indicates a transaction processed using the user account;
   automatically modifying, by the processor, a display of the application icon based on the transaction processing parameter, wherein the display indicates a change to the financial indicator graphic based on the transaction processed using the user account; and
   dynamically updating, by the processor, the modified display of the application icon based on the transaction processed using the user account.

2. The method of claim 1, wherein modifying the financial indicator graphic to indicate subsequent changes to the user-selected budget goal comprises:
   detecting, by the processor, a scan of an item by a merchant device during a payment request, the item being indicated by the user-selected budget goal;
   processing, by the processor, the transaction for the item using funds from the account balance; and
   generating, by the processor, a further modified layout of the plurality of financial strength indicators of the financial indicator graphic based on an additional account update indicting the user has met the user-selected budget goal,
   wherein the display is modified based on the further modified layout.

3. The method of claim 1, further comprising:
   receiving, by the processor, the account update for a plurality of user budgets including the user budget, each of the plurality of user budgets associated with respective ones of a plurality of user-selected budget goals, wherein said accessing the account update is based on the received account update.

4. The method of claim 1, wherein each of the plurality of financial strength indicators comprises an account balance level indicator associated with the user account or a parameter of the user-selected budget goal, and the account balance level indicator obfuscating a balance of the user account from display.

5. The method of claim 1, wherein at least one of the plurality of financial strength indicators indicates whether the user account is at or below the user-selected budget goal.

6. The method of claim 1, further comprising:
providing, by the processor, a second user interface to the mobile device of the user that includes one or more selectable options to change expressions for the financial indicator, wherein the one or more selectable options include graphical indicators or auditory indicators, wherein the graphical indicators include the financial indicator graphic.

7. The method of claim 1, wherein the financial indicator graphic does not include any personal information associated with the user or detailed information about the user account.

8. The method of claim 1, further comprising:
responsive to detecting an icon selection of the application icon by the user, communicating, by the processor, additional information to the mobile device, the additional information comprising the detailed information for the user account and the user-selected budget goal that is accessible by the user upon the execution of the application associated with the application icon.

9. A server, comprising:
a non-transitory memory storing instructions; and
a processor configured to execute the instructions to cause the server to:
monitor transaction activity associated with a user account of a user of a mobile device, the user account associated with a user budget with a user-selected budget goal and an account balance;
determine, based on the monitoring of the transaction activity, an account update indicating at least one change to a financial indicator associated with the user account or the user budget;
determine, based on analysis of the user budget with the account update, to modify at least one of a plurality of financial strength indicators of a financial indicator graphic for the financial indicator, the financial indicator graphic associated with an application icon configured to display detailed information for the user account upon execution of an application associated with the application icon, the financial indicator graphic displayed on the application icon and indicating a current status of the financial indicator, the plurality of financial strength indicators of the financial indicator graphic arranged on the application icon according to an initial layout;
update, based on the determination to modify the at least one of the plurality of financial strength indicators, the initial layout of the plurality of financial strength indicators as a new layout, the new layout being different from the initial layout displayed by the application icon;
provide the new layout to the mobile device for the financial indicator graphic of the application icon to include the modified at least one of the plurality of financial strength indicators in the new layout, wherein the financial indicator graphic is modifiable to indicate subsequent changes to the user-selected budget goal;

detect a transaction processing parameter associated with the financial indicator, wherein the transaction processing parameter indicates a transaction processed using the user account;
automatically modify a display of the application icon based on the transaction processing parameter, wherein the display indicates a change to the financial indicator graphic based on the transaction processed using the user account; and
dynamically update the modified display of the application icon based on the transaction processed using the user account.

10. The server of claim 9, wherein executing the instructions further causes the server to provide a second user interface to the mobile device of the user that includes one or more selectable options to change expressions for the financial indicator, wherein the one or more selectable options include graphical indicators or auditory indicators, wherein the graphical indicators include the financial indicator graphic.

11. The server of claim 9, wherein modifying the financial indicator graphic to indicate subsequent changes to the user-selected budget goal comprises:
detecting a scan of an item by a merchant device during a payment request, the item being indicated by the user-selected budget goal;
processing transaction for the item, associated with the user-selected budget goal, using funds from the account balance; and
generating a further modified layout of the plurality of financial strength indicators of the financial indicator graphic based on an additional account update indicting the user has met the user-selected budget goal,
wherein the display is modified based on the further modified layout.

12. The server of claim 9, wherein executing the instructions further causes the server to receive the account update for a plurality of user budgets including the user budget, each of the plurality of user budgets associated with respective one of a plurality of user-selected budget goals, wherein said determining the account update is further based on the received account update.

13. The server of claim 9, wherein each of the plurality of financial strength indicators comprises an account balance level indicator associated with the user account or a parameter of the user-selected budget goal, and the account balance level indicator obfuscating a balance of the user account from display.

14. The server of claim 9, wherein the financial indicator graphic does not include any personal information associated with the user or detailed information about the user account.

15. A non-transitory machine-readable medium having instructions stored thereon, the instructions executable to cause performance of operations comprising:
monitoring transaction activity associated with a user account of a user of a mobile device, the user account associated with a user budget with a user-selected budget goal and an account balance;
determining, based on the monitoring of the transaction activity, an account update indicating at least one change to a financial indicator associated with the user account or the user budget;
determining, based on analysis of the user budget with the account update, to modify at least one of a plurality of financial strength indicators of a financial indicator graphic for the financial indicator, the financial indicator graphic associated with an application icon configured to display detailed information for the user account upon execution of an application associated with the application icon, the financial indicator graphic displayed on the application icon and indicating a current status of the financial indicator, the plurality of financial strength indicators of the financial indicator graphic arranged on the application icon according to an initial layout;

updating, based on the determining to modify the at least one of the plurality of financial strength indicators, the initial layout of the plurality of financial strength indicators as a new layout, the new layout being different from the initial layout displayed by the application icon;

providing the new layout to the mobile device for the financial indicator graphic of the application icon to include the modified at least one of the plurality of financial strength indicators in the new layout, wherein the financial indicator graphic is modifiable to indicate subsequent changes to the user-selected budget goal;

detecting a transaction processing parameter associated with the financial indicator, wherein the transaction processing parameter indicates a transaction processed using the user account;

automatically modifying a display of the application icon based on the transaction processing parameter, wherein the display indicates a change to the financial indicator graphic based on the transaction processed using the user account; and dynamically updating the modified display of the application icon based on the transaction processed using the user account.

16. The non-transitory machine-readable medium of claim 15, wherein modifying the financial indicator graphic to indicate subsequent changes to the user-selected budget goal comprises:

detecting a scan of an item by a merchant device during a payment request, the item being indicated by the user-selected budget goal;

processing a transaction for the item, associated with the user-selected budget goal, using funds from the account balance; and generating a further modified layout of the plurality of financial strength indicators of the financial indicator graphic based on an additional account update indicting the user has met the user-selected budget goal, wherein the display is modified based on the further modified layout.

17. The non-transitory machine-readable medium of claim 15, wherein the operations further comprise receiving the account update for a plurality of user budgets including the user budget, each of the plurality of user budgets associated with a respective one of a plurality of user-selected budget goals, wherein said determining the account update is further based on the received account update.

18. The non-transitory machine-readable medium of claim 15, wherein the operations further comprise, in response to detecting an icon selection of the application icon by the user, communicating additional information to the mobile device, the additional information comprising the detailed information for the user account and the user-selected budget goal that is accessible by the user upon the execution of the application associated with the application icon.

19. The non-transitory machine-readable medium of claim 15, wherein each of the plurality of financial strength indicators comprises an account balance level indicator associated with the user account or a parameter of the user-selected budget goal, and the account balance level indicator obfuscating a balance of the user account from display.

20. The non-transitory machine-readable medium of claim 15, wherein the financial indicator graphic does not include any personal information associated with the user or detailed information about the user account.

* * * * *